US010710012B2

(12) United States Patent
Vincent et al.

(10) Patent No.: US 10,710,012 B2
(45) Date of Patent: Jul. 14, 2020

(54) MULTI-USE ACOUSTIC LEVITATION TRAP

(71) Applicant: AENITIS TECHNOLOGIES, Mitry-Mory (FR)

(72) Inventors: Emmanuel Vincent, Mitry-Mory (FR); Pierre Bohec, Saint-Denis (FR)

(73) Assignee: AENITIS TECHNOLOGIES, Mitry-Mory (FR)

( * ) Notice: Subject to any disclaimer, the term of this patent is extended or adjusted under 35 U.S.C. 154(b) by 320 days.

(21) Appl. No.: 15/762,190

(22) PCT Filed: Sep. 23, 2016

(86) PCT No.: PCT/EP2016/072709
§ 371 (c)(1),
(2) Date: Mar. 22, 2018

(87) PCT Pub. No.: WO2017/050977
PCT Pub. Date: Mar. 30, 2017

(65) Prior Publication Data
US 2018/0290089 A1 Oct. 11, 2018

(30) Foreign Application Priority Data
Sep. 23, 2015 (EP) .................................... 15186475

(51) Int. Cl.
B01D 43/00 (2006.01)
G01N 15/14 (2006.01)
(Continued)

(52) U.S. Cl.
CPC ........ B01D 43/00 (2013.01); B01L 3/502761 (2013.01); G01N 15/1404 (2013.01);
(Continued)

(58) Field of Classification Search
CPC .................. B01D 43/00; B01D 49/006; G01N 2015/0038; G01N 2015/142;
(Continued)

(56) References Cited

U.S. PATENT DOCUMENTS 5,085,783 A    2/1992 Feke et al.
7,373,805 B2 * 5/2008 Hawkes ............... B01D 21/283
                                                        367/13
(Continued)

FOREIGN PATENT DOCUMENTS

GB    2339703 A        2/2000
WO    2005/107939 A1  11/2005
WO    2011/027146 A2   3/2011

OTHER PUBLICATIONS

International Search Report, dated Dec. 21, 2016, from corresponding PCT application No. PCT/EP2016/072709.

Primary Examiner — Nathaniel J Kolb
(74) Attorney, Agent, or Firm — Young & Thompson

(57) ABSTRACT

Disclosed is a device, suitable for use as an acoustic resonator, including a base adapted to be coupled to at least one acoustic wave generator, a spacer including an aperture and a reflector, wherein the base includes a protruding part having a thickness t; the aperture of the spacer is complementary to the protruding part of the base; the device further includes a housing having an aperture complementary to the protruding part of the base and wherein the inner edge of the aperture has the same thickness t than the protruding part; and the housing is positioned between the spacer and the reflector, such that the thickness of the inner edge of the spacer defined the thickness of a cavity between the protruding part and the reflector. Also disclosed is a method of trapping particles in a fluid.

20 Claims, 7 Drawing Sheets

(51) Int. Cl.
 *B01L 3/00* (2006.01)
 *G01N 15/00* (2006.01)
 *G01N 15/10* (2006.01)
 *B01D 51/08* (2006.01)
 *B01D 21/28* (2006.01)

(52) U.S. Cl.
 CPC ............ *B01D 21/283* (2013.01); *B01D 51/08* (2013.01); *B01L 2200/0668* (2013.01); *B01L 2400/0439* (2013.01); *G01N 15/1056* (2013.01); *G01N 2015/0038* (2013.01); *G01N 2015/1081* (2013.01); *G01N 2015/142* (2013.01); *G01N 2015/149* (2013.01)

(58) Field of Classification Search
 CPC ........... G01N 2015/1415; G01N 15/14; G01N 15/1404; G01N 15/1056; B01L 2200/0668
 See application file for complete search history.

(56) References Cited

U.S. PATENT DOCUMENTS

| | | | |
|---|---|---|---|
| 2006/0096353 A1* | 5/2006 | Hawkes | B01D 21/283 73/24.03 |
| 2010/0139377 A1 | 6/2010 | Huang et al. | |
| 2013/0277316 A1* | 10/2013 | Dutra | A61M 1/3681 210/748.02 |
| 2013/0327130 A1 | 12/2013 | Hoyos et al. | |

* cited by examiner

MULTI-USE ACOUSTIC LEVITATION TRAP

FIELD OF INVENTION

The present invention pertains to the field of device for manipulating particles in a fluid. In particular, the present invention relates to a device suitable for use as an acoustic resonator for manipulating particles in a fluid by means of acoustic waves.

BACKGROUND OF INVENTION

Acoustic waves can be used to handle or sort particles in a fluid by means of an acoustic force field. In the conventional techniques, known in the prior art, acoustic resonators comprises a cavity wherein one of the walls comprises an acoustic wave generator and the opposing wall serves as passive reflector. The ultrasonic wave generated is reflected and the wave superposition is known as a standing wave: at least one acoustic pressure node is created at a given position along a dimension of a cavity of an acoustic resonator by providing a resonance condition for the acoustic wave. Particles manipulation with ultrasonic standing waves is known as a powerful tool for handling, moving or trapping particles in microfluidics devices.

For instance, U.S. Pat. No. 7,373,805 discloses an acoustic resonator comprising an ultrasonic transducer glued to a coupling plate, an acoustic resonator and a spacer arranged between the coupling plate and the acoustic resonator and defining a resonant cavity. The coupling plate, the spacer and the acoustic resonator are held in place between a base and a top plate secured with screws. The screws must be strongly tightened in order to limit leakages of fluid filling the resonant cavity. Furthermore, the screwing between the base and the top plate, which defined the thickness of the resonant cavity, must be precisely controlled in order to ensure a regular thickness.

Within acoustic resonator, the thickness of the resonant cavity is indeed of the utmost importance as the resonance frequency is achieved by reaching the following condition:

$$w = n \cdot \frac{\lambda}{2}$$

wherein w is the thickness of the resonator, n is the number of pressure nodes of the standing waves and $\lambda$ the wavelength equal to $$\frac{c_f}{f}$$

wherein $c_f$ is the speed of sound in the fluid filling the resonant cavity of the resonator and f is the acoustic frequency.

Consequently, the resonator disclosed in U.S. Pat. No. 7,373,805 requires a complicated assembly and may exhibit leakages.

US patent application 2013/0327130 also discloses acoustic resonators comprising four layers: a transducer, a coupling steel layer, a spacer and an acoustic reflector. The spacer is assembled in sandwich between the coupling steel layer and the acoustic reflector with neoprene glue. Therefore, the resonator disclosed in US 2013/0327130 cannot be reused; especially the spacer cannot be changed in order to change the size of the resonant cavity.

There is thus a need for an easy-to-use acoustic resonator, avoiding leakage of fluid and wherein the resonant cavity may be opened and accessible and wherein the spacer may be easily changed in order to change the size of the resonant cavity. Especially, as the device of the invention may be used with living objects, there is a particular need for a device which may be easily disassembled and cleaned, e.g. autoclaved.

Moreover, the acoustic resonators of the prior art are designed for handling only a small amount of particles—from 1 to several hundred—within microfluidic devices. U.S. Pat. No. 7,373,805 discloses indeed the use of particles of diameter in the order of 1 µm and US 2013/03271430 discloses that the particles have an average size of about 50 nm to about 5 µm. There is therefore also a need for devices suitable for the analysis, separation and collection, without complex manipulation, of large particles, especially large living particles such as cells or cluster of cells, having an average size from 0.1 µm to few hundreds micrometers.

SUMMARY

To that end the present invention relates to a device, suitable for use as an acoustic resonator, comprising a base adapted to be coupled to at least one acoustic wave generator, a spacer comprising an aperture and a reflector, wherein:
- the base comprises a protruding part having a thickness t;
- the aperture of the spacer is complementary to the protruding part of the base;
- the device further comprises a housing having an aperture complementary to the protruding part of the base and the inner edge of the aperture of the housing has the same thickness t than the protruding part; and
- the housing is positioned between the spacer and the reflector, such that the thickness of the inner edge of the spacer defined the thickness of a cavity between the protruding part and the reflector.

Within the device of the present invention, the base, the spacer and the housing are held in place due to the protruding part of the base inserted within the apertures of the spacer and the housing without glue. The spacer may thus be easily replaced and the resonant cavity may be accessed. Moreover, the device of the present invention avoids leakage of fluid as the fluid should follow a tortuous path to flow out of the resonant cavity.

According to one embodiment, the protruding part is axisymmetric, preferably cylindrical, rhombohedral, parallelepiped or ribbon-shaped.

According to one embodiment, the device further comprises a supporting base and a top part, wherein the base, the spacer, the housing and the reflector are held in position between the supporting base and the top part. According to one embodiment, the supporting base extends outwardly from the base; the top part encompasses the base, the spacer, the housing and the reflector; and the supporting base and the top plate are secured together, for instance with screws. According to one embodiment, the device further comprises a gasket ensuring tightness between the supporting base and the top part.

According to one embodiment, the protruding part comprises at least one inlet and at least one outlet. According to one embodiment, the base, the protruding part and/or the housing comprises a material selected from metal or plastic. According to one embodiment, the reflector comprises an optically transparent material selected from glass, quartz or plastic. According to one embodiment, the protruding part comprises an optically transparent material selected from glass, quartz or plastic. According to one embodiment, the top part comprises at the top an optically transparent window. According to one embodiment, the spacer comprises a material selected from polyimide or a polyethylene terephthalate.

The present invention also relates to an acoustic resonator comprising the device according to the invention and at least one acoustic wave generator coupled to the base. According to one embodiment, the at least one acoustic wave generator is located below the protruding part of the base. According to one embodiment, the at least one acoustic wave generator is an ultrasonic wave generator. According to one embodiment, the at least one acoustic wave generator is a piezo transducer. According to one embodiment, the at least one acoustic wave generator is ring-shaped.

The present invention further relates to a method of trapping particles in a fluid comprising the steps of:
  i. providing an acoustic resonator according to the invention;
  ii. introducing a fluid comprising particles into the cavity;
  iii. selecting the frequency f such that the path length of the standing wave in the cavity is a multiple of ½ of the wavelength of the sound wave therein; and
  iv. trapping the particles.

Definitions

In the present invention, the following terms have the following meanings:
  "Acoustic resonator" refers to a device using acoustic waves to apply forces on particles to be manipulated.
  "Levitation" refers to the fact that acoustic force counteracts gravity force preventing species from settling down in the cavity and maintaining them in a controlled position.
  "Optically transparent" refers to a part exhibiting high light transmittance (above 50%, preferably above 75%, more preferably above 90%) over at least a portion of the visible light spectrum (about 400 to about 700 nm).

DETAILED DESCRIPTION

The following detailed description will be better understood when read in conjunction with the drawings. For the purpose of illustrating, the device is shown in the preferred embodiments. It should be understood, however that the application is not limited to the precise arrangements, structures, features, embodiments, and aspect shown. The drawings are not drawn to scale and are not intended to limit the scope of the claims to the embodiments depicted. It should be understood that the spatial descriptions (e.g., "above", "below", "up", "down", "top", "bottom", "on", "under", etc.) made herein are for purposes of illustration only, and that devices of the present invention can be spatially arranged in any orientation or manner.

According to a first aspect, as depicted in FIGS. 1 and 2, this invention relates to a device 1, suitable for use as an acoustic resonator, comprising a base 2 adapted to be coupled to at least one acoustic wave generator, a spacer 3 comprising an aperture 31 and a reflector 5, wherein:
  the base 2 comprises a protruding part 21 having a thickness t;
  the aperture of the spacer 31 is complementary to the protruding part of the base 21;
  the device further comprises a housing 4 having an aperture 41 complementary to the protruding part of the base 21 and the inner edge of the aperture of the housing 41 has the same thickness t than the protruding part of the base 21; and
  the housing 4 is positioned between the spacer 3 and the reflector 5, such that the thickness of the spacer 3 defined the thickness of a cavity between the protruding part of the base 21 and the reflector 5.

According to one embodiment, the housing 4 is positioned between the spacer 3 and the reflector 5, thereby arranging a cavity between the protruding part 21 and the reflector 5; such cavity having a thickness identical to that of the inner edge of the spacer 3.

According to one embodiment, the protruding part 21 is inserted within the aperture of the spacer 31 and the aperture of the housing 41.

According to one embodiment, the base 2 is a plate. According to one embodiment, the base 2 is adapted to be a coupling layer between a resonant cavity and the at least one acoustic wave generator. According to one embodiment, the base 2 is cylindrical (i.e. has a circular periphery).

According to one embodiment, the base 2 comprises a protruding part 21 protruding upwardly from the base 2. According to one embodiment, the protruding part 21 has a constant thickness. According to one embodiment, the thickness of the protruding part 21 is ranging from 1 to 10 mm, preferably from 2 to 5 mm.

According to another embodiment as depicted in FIG. 4, the protruding part 21 is hollow and comprises a peripheral groove 211 configured to accommodate a bottom plate 212, acting as the bottom plate of the cavity. Said bottom plate 212 has a thickness t. According to one embodiment, the thickness t of the bottom plate 212 is ranging from 1 to 1.0 mm, preferably from 2 to 5 mm. According to one embodiment, said peripheral groove 211 comprises an O-ring configured to ensure tightness of the cavity.

According to one embodiment, the protruding part 21 is axisymmetric. According to one embodiment, the protruding part 21 is cylindrical, rhombohedral, parallelepiped or ribbon-shaped.

According to one embodiment, the area of the protruding part 21 is ranging from 1 to 10 $cm^2$, preferably from 1 to 3 $cm^2$.

According to one embodiment, the base 2 comprises at least one protruding part 21. According to one embodiment, the base 2 comprises more than one protruding part 21. According to one embodiment, the base 2 comprises more than one hollow protruding part 21, each comprising a bottom plate 212.

According to one embodiment, the spacer 3 is a plate. According to one embodiment, the spacer 3 is a plate having a constant thickness. According to one embodiment, the spacer 3 is cylindrical (i.e. has a circular periphery). According to one embodiment, the thickness of the spacer 3 is ranging from 10 µm to 2000 µm, preferably from 50 µm to 1000 µm, more preferably from 50 to 500 µm.

The spacer 3 comprises an aperture 31. According to one embodiment, the aperture of the spacer 31 is complementary to the protruding part 21. According to one embodiment, the shape of the aperture of the spacer 31 is complementary to the shape of the protruding part 21. According to one embodiment, the aperture of the spacer 31 has a shape adapted to cooperate with the protruding part 21. According to one embodiment, the aperture of the spacer 31 has the same shape as the protruding part 21, such that the protruding part 21 may be inserted through the aperture of the spacer 31 without mechanical play, the spacer 3 lying on the base 2. Due to the protruding part 21, the spacer 3 is locked in translation in the plane of the base 2. According to one embodiment, the shape of the protruding part 21 prevents rotation of the spacer 3 relative to the base 2. In said embodiment, the protruding part 21 is not cylindrical but may be rhombohedral, parallelepiped or ribbon-shaped.

According to one embodiment, the spacer 3 and the protruding part 21 does not exhibit the same thickness. According to one embodiment, the thickness of the spacer 3 is smaller than the thickness of the protruding part 21. According to one embodiment, the ratio between the thickness of the spacer 3 and the thickness of the protruding part 21 is lower than 0.5. According to one embodiment, the ratio between the thickness of the spacer 3 and the thickness of the protruding part 21 is ranging from 0.001 to 0.5, preferably from 0.005 to 0.2, preferably about 0.01.

According to one embodiment, the spacer 3 comprises a material selected from polyimide or polyethylene terephthalate.

According to one embodiment, the spacer 3 comprises at least one aperture 31. According to one embodiment, the spacer 3 comprises more than one aperture 31.

According to one embodiment, the reflector 5 is a plate. According to one embodiment, the reflector 5 has a constant thickness. According to one embodiment, the reflector 5 is cylindrical (i.e. has a circular periphery). According to one embodiment, the reflector 5 does not comprise any aperture. According to one embodiment, the thickness of the reflector 5 is ranging from 500 μm to 4 mm, preferably from 1 mm to 2 mm.

According to one embodiment, the reflector 5 comprises a material chosen among: organic or mineral glasses, quartz, thermoplastic materials or metallic alloys. According to one embodiment, the reflector 5 is made from titanium alloy such as TA6V. According to one embodiment, the reflector 5 comprises an optically transparent material. According to one embodiment, the reflector 5 comprises an opaque material.

According to one embodiment, the housing 4 is a plate. According to one embodiment, the housing 4 has a constant thickness, especially the inner edge of the aperture 41 has a constant thickness. According to one embodiment, the thickness of the housing 4, especially the thickness of the inner edge of the aperture 41 has the same thickness t than the thickness of the protruding part of the base 21. According to one embodiment, the housing 4 is cylindrical (i.e. has a circular periphery). According to one embodiment, the housing 4 comprises an aperture 41. According to one embodiment, the thickness of the housing 4 is ranging from 1 to 10 mm, preferably from 2 to 5 mm.

According to one embodiment, the aperture of the housing 41 is complementary to the protruding part 21. According to one embodiment, the shape of the aperture of the housing 41 is complementary to the shape of the protruding part 21. According to one embodiment, the aperture of the housing 41 is adapted to cooperate with the protruding part 21. According to one embodiment, the aperture of the housing 41 has the same shape as the protruding part 21, such that the protruding part 21 may be inserted within the aperture of the housing 41 without mechanical play, the housing 4 lying on the spacer 3. Due to the protruding part 21, the housing 4 is locked in translation along the plane of the base 2. According to one embodiment, the shape of the protruding part 21 prevents rotation of the housing 4 relative to the base 2. In said embodiment, the protruding part 21 is not cylindrical but may be rhombohedral, parallelepiped or ribbon-shaped.

According to one embodiment, the housing 4 comprises at least one aperture 41.

According to one embodiment, the housing 4 comprises more than one aperture 41.

According to one embodiment, the base 2, the protruding part 21 and/or the housing 4 comprises a material selected among: organic or mineral glasses, quartz, thermoplastic materials, metal such as for instance aluminum or stainless steel. According to one embodiment, the base 2, the protruding part 21, the housing 4 and/or the reflector 5 comprises or consist of a material having high acoustic impedance, preferably ten times greater than the acoustic impedance of the fluid filing the resonant cavity. According to one embodiment, the protruding part 21 and the reflector 5 are made from different materials. According to one embodiment, the protruding part 21 and the reflector 5 are made from the same material.

According to one embodiment, the protruding part 21 is made of an optically transparent material. According to one embodiment, the protruding part 21 is made of a material chosen among: organic or mineral glasses, quartz or thermoplastic materials.

According to one embodiment wherein the base 2 comprises a protruding part 21 with a removable bottom plate 212, said bottom plate 212 is made of an optically transparent material. According to one embodiment, said bottom plate 212 is made of a silicon wafer. According to one embodiment, said bottom plate 212 is made of a material chosen among: organic or mineral glasses, quartz or thermoplastic materials.

According to one embodiment, the device comprises successively the base 2, the spacer 3, the housing 4 and the reflector 5; with the protruding part of the base 21 inserted within the aperture of the spacer 31 and the aperture of the housing 41, such that the device comprises a cavity between the protruding part 21 and the reflector 5, the said cavity having the same thickness than the thickness of the spacer 3. According to one embodiment, the said cavity has a volume ranging from 200 μL to 2000 μL, preferably from 1000 μL to 2000 μL. On the contrary to the devices of the prior art, with such volume of cavity, more than one thousand, preferably more than hundreds of thousands of particles may be manipulated. Furthermore, such dimensions of cavity enable to manipulate micron-sized particles.

According to one embodiment, as the spacer 3 and the housing 4 have a constant thickness, the upper and lower wall of the cavity (i.e. the upper surface of the protruding part and the lower surface of the reflector) are parallel.

According to one embodiment, the spacer 3 and/or the housing 4 do not have a constant thickness so that the upper and lower wall of the cavity (i.e. the upper surface of the protruding part and the lower surface of the reflector) are not parallel.

As the base 2, the spacer 3 and the housing 4 are not glued together; the spacer 3 may be easily changed in order to change the thickness of the cavity.

According to one embodiment, the housing 4 comprises a peripheral wall 42 protruding upwardly for encasing the reflector 5 without mechanical play. According to one embodiment, the reflector 5 lies on the housing 4. According to one embodiment, the reflector 5 is not glued to the housing 4. According to one embodiment, the reflector 5 is glued or fixed to the housing 4. According to one embodiment wherein there is no flow of fluid within the cavity, the reflector may lie on the housing and be maintained by capillary forces without glue or fixation means.

According to one embodiment, the device further comprises a supporting base 6 and a top part 7 enclosing together the base 2, the spacer 3, the housing 4 and the reflector 5, preferably without mechanical play. According to one embodiment, the base 2, the spacer 3, the housing 4 and the reflector 5 are held in position between the supporting base 6 and the top part 7.

According to one embodiment, the supporting base 6 extends downwardly and outwardly from the base 2. According to one embodiment, the top part 7 encompasses the base 2, the spacer 3, the housing 4 and the reflector 5. According to one embodiment, the supporting base 6 and the top plate 7 are secured together, for instance with screws.

According to one embodiment, the device further comprises a gasket 8 ensuring tightness between the supporting base 6 and the top part 7.

According to one embodiment, the top part 7 comprises at the top an optically transparent window. According to one embodiment, the cavity can be observed thought the optically transparent window with an electronic microscope in order, for example, to study the acoustic interaction between particles.

According to one alternative embodiment as depicted in FIG. 4, the device 1 further comprises a supporting base 6 comprising a protruding part 61 having a shape complementary to the shape of the protruding part 21 of the base 2, so that the protruding part 61 of the supporting base 6 may be inserted within the protruding part 21 of the base 2. According to said embodiment, when an acoustic wave generator is fixed to the protruding part of the supporting base 61, the acoustic wave generator may be coupled to the protruding part of the base 21. According to one embodiment, the device does not comprises a top part 7 and the supporting base 6, the housing 4 and the base 2 are bolted, screwed or maintained by any means known by one skilled in the art. According to one embodiment, the protruding part of the supporting base 61 is made of an optically transparent material. According to one embodiment, the protruding part of the supporting base 61 is made of a material chosen among: organic or mineral glasses, quartz or thermoplastic materials.

According to one embodiment, the protruding part 21 comprises at least one inlet 22 and at least one outlet 23. According to one embodiment, said inlet 22 and outlet 23 are suitable for filing the cavity and/or for creating a flow of fluid within the cavity. According to one embodiment, the base and/or the supporting base comprises an inlet channel and an outlet channel, fluidly connected to respectively the inlet and the outlet of the protruding part. According to one embodiment the inlet 22 and the outlet 23 are not located at the center of the protruding part 21. According to one embodiment, the flow rate depends on the particles to be manipulated, the cavity volume and the acoustic force field applied. For example, the fluid may flow at a flow rate ranging from 0.01 mL/min to 100 mL/min. According to one embodiment, more than one flow rate may be implemented during the manipulation of particles. According to one embodiment, the fluid is a liquid. According to one embodiment, the liquid is selected from a water-based liquid, an organic liquid, a biological liquid such as blood plasma, a tissue culture media such as LB (Lysogeny Broth) basic growing bacteria culture medium, a ionic liquid or complex fluids such as polymeric solutions leading to scaffold fabrication.

According to one embodiment wherein the protruding part 21 comprises a bottom plate 212, the bottom plate may comprise at least one inlet and at least one outlet suitable for filing the cavity and/or for creating a flow of fluid within the cavity.

According to one embodiment, the protruding part 21 does not comprise any inlet or outlet. In said embodiment, the device is used for analysis e.g. of a drop or drops of a solution disposed in the cavity without any flow (i.e. before positioning the reflector on the housing).

According to one embodiment, the protruding part 21 comprises at least two inlets: at least on inlet introduces the sample and at least one inlet introduces a reactive (e.g. for cleaning, diluting or testing the sample). According to one embodiment, the protruding part 21 comprises at least two outlets. According to one embodiment, each outlet is fluidly connected to valves which open or close depending of the sample to be collected.

According to one embodiment, the thickness of the protruding part 21 about one outlet is different from the thickness of the protruding part 21 about the other outlet.

According to one embodiment, as depicted in FIG. 2, the protruding part 21 comprises a plurality of separators 24, such as for instance pins, protruding upwardly such that the resonant cavity comprises a plurality of compartments in fluid communication between each other. According to one embodiment, the separator has a thickness equal or lower than the thickness of the inner edge of the spacer 3. According to one embodiment, each compartment is adapted to be couple with an acoustic wave generator. According to one embodiment, the said compartments may have different thicknesses, or may be used with different mediums, different frequencies and/or different acoustic wave generators.

According to one embodiment, in order to parallelize the manipulation of particles, the base may comprises more than one protruding part and the spacer and the housing may comprise more than one aperture complementary to the protruding parts. Within said embodiment, different particles may be manipulated or the same particles may be manipulated within different fluids.

According to a second aspect, as depicted in FIG. 3, the invention also relates to an acoustic resonator 11 comprising the device 1 according to the invention and at least one acoustic wave generator 9 coupled to the base.

According to one embodiment, the at least one acoustic wave generator is cylindrical, square-shaped, rod-shaped or ring-shaped.

According to one embodiment, the at least one acoustic wave generator 9 is glued or fixed to the base 2.

According to one embodiment, the at least one acoustic wave generator 9 is glued or fixed to the protruding part 61 of the supporting base 6. According to one embodiment, the height of the protruding part 61 is configured so that when at least one acoustic wave generator 9 is glued or fixed to said protruding part 61, the at least one acoustic wave generator 9 is coupled to the protruding part 21. Said coupling may be a dry coupling or may use any coupling means.

According to one embodiment, the at least one acoustic wave generator 9 is located below the protruding part of the base 21. According to one embodiment, a plurality of acoustic wave generators 9 is located below the protruding part of the base 21. According to one embodiment, the base 2 is etched on the back of the protruding part 21 for encasing the at least one acoustic wave generator 9.

According to one embodiment, the at least one acoustic wave generator 9 is located at the top of the protruding part of the supporting base 61. According to one embodiment, a plurality of acoustic wave generators 9 is located at the top of the protruding part of the supporting base 61.

According to one embodiment, the at least one acoustic wave generator 9 is an ultrasonic wave generator. According to one embodiment, the at least one acoustic wave generator 9 is a piezo transducer.

According to one embodiment, the area of the optically transparent part of the reflector 5 is larger than the area of the at least one acoustic wave generator, thereby enabling to investigate upstream and downstream of the acoustic force field.

According to one embodiment, the reflector 5, the protruding part 21 of the base 2 and the protruding part 61 of the supporting base 6 comprises an optically transparent material, and the at least one acoustic wave generator 9 is at least one ring-shaped acoustic wave generator. Said embodiment enables optical analysis of the cavity by means of transmission microscopy.

According to a third aspect, the invention also relates to a method of trapping particles in a fluid using the device according to the invention.

Especially, the method of trapping particles in a fluid comprises the steps of:
i. providing an acoustic resonator according to one embodiment of the present invention;
ii. introducing a fluid comprising particles into the cavity;
iii. selecting the frequency f such that the path length of the standing wave in the cavity is a multiple of ½ of the wavelength of the sound wave therein; and
iv. trapping the particles.

According to one embodiment, the method of trapping particles may be implemented without flow of fluid or with continuous or pulsatile flow of fluid.

According to one embodiment, the trapping of particles may be implemented by levitation, selective focusing, MSF, flow trapping sorting or selective focusing trapping. Therefore, the acoustic resonator of the invention is a multi-use acoustic trap, preferably a multi-use acoustic levitation trap. According to one preferred embodiment, the trapping of particles may be implemented by levitation.

Levitation is generated by acoustic standing waves, preferably ultrasonic standing waves originating an ultrasonic radiation pressure profile characterized by nodes and antinodes in the cavity thickness. Nodes and antipodes can be placed anywhere within the cavity thickness, even close to walls. When nodes are placed at the middle plane of the cavity, for instance, the radiation force that is a focusing force pulls particles away from the walls preventing particle-wall interactions. In other configuration, by slightly changing the frequency, the nodal position can be modified by moving it in controlled way toward the walls: the equilibrium position of the particles can thus be modulated through the whole cavity thickness.

By pushing species toward either wall or by placing the nodes or the antinodes close the walls it is also possible to generate and study particle-wall interactions, as well as to generate partial segregations based on the fact that relaxation to the nodal plane is size-selective.

According to one embodiment, the acoustic resonator of the invention may be used with non-living particles and with living particles such as for instance cells, bacteria, viruses, DNA, proteins and the like.

According to one embodiment, the particles are nano- or micron-sized particles, i.e. having at least one size ranging from 0.1 to few hundreds micrometers, preferably 0.1 to 900 µm, more preferably from 1 to 500 µm, even more preferably from 10 to 400 µm.

According to one embodiment, the particles to be manipulated or trapped are selected from rigid, elastic, mineral or biological particles. According to one embodiment, the particles to be manipulated or trapped are selected from algae, microorganisms, bacteria, viruses, DNA, proteins or leavening. According to one embodiment, the particles to be manipulated or trapped are selected from colloidal emulsion, non-colloidal emulsions, ionic fluids or active fluids. According to one embodiment, the particles to be manipulated or trapped are selected from cells, parts of cells such as cell debris, or cluster of cells; such as for instance blood cells, cancellous cells or epithelial cells. According to one embodiment, the particles to be manipulated or trapped are selected from phospholipids, liposomes or vesicles. According to one embodiment, the particles to be manipulated or trapped are selected from micro-particles such as metallic microfibers; or nanoparticles such as carbon nanotubes or mixture thereof. According to one embodiment, the method of trapping particles is implemented with self-propelled objects such as bacteria in biological or ionic fluids or micro-/nano-robots. According to one embodiment, the fluid comprising the particles is an organic or an inorganic fluid.

According to one embodiment, the upper surface of the protruding part and/or the lower surface of the reflector may comprise a sensing medium enabling detection of particles.

According to one embodiment, the upper surface of the protruding part and/or the lower surface of the reflector may be labelled with specific antibodies in order to trap specific cells labeled with surface antigen receptors flowing through the cavity, either by an imposed flow or by the flow generated by the acoustic force field.

According to one embodiment, the acoustic resonator of the invention may be used in tissue engineering by aggregating and manipulating different cells.

According to one embodiment, the method of trapping may also comprises the step of aggregating the particles for the fabrication of two- or three-dimensional constructs, for instance for producing filters.

According to one embodiment, the device of the invention and/or the acoustic resonator of the invention is temperature controlled by any means known by one skilled in the art such as for instance a Pelletier system or a heating circuit within the base.

While various embodiments have been described and illustrated, the detailed description is not to be construed as being limited hereto. Various modifications can be made to the embodiments by those skilled in the art without departing from the true spirit and scope of the disclosure as defined by the claims.

REFERENCES

1—Device suitable for use as an acoustic resonator;
11—Acoustic resonator;

2—Base;
21—Protruding part;
211—Groove;
212—Bottom plate;
22—Inlet;
23—Outlet;
24—Separator;
3—Spacer;
31—Aperture of the spacer;
4—Housing;
41—Aperture of the housing;
42—Peripheral wall;
5—Reflector;
6—Supporting base;
61—Protruding part;
7—Top part
8—Gasket;
9—Acoustic wave generator.

EXAMPLES

The present invention is further illustrated by the following examples.

Example 1

Bacteria Manipulation

Bacteria suspension is injected within the cavity of the acoustic resonator of the present invention. The concentration of bacteria may vary from high concentration to very diluted samples.

An acoustic force field is implemented within the cavity by means of the acoustic wave generator and several thousands or millions of bacteria are trapped under the acoustic force field, thereby inducing a stable aggregate in levitation.

A stable colony of bacteria can therefore be studied by observing its time evolution in function of the suspending medium. The entire colony can be trapped and the medium modified in order to establish new equilibriums. It is also possible within the present acoustic resonator to eliminate specific bacteria by modifying the medium.

Once the sample has been manipulated, the cavity may be demounted and the sample may be collected after the assay in order to be submitted to other studies with any technique known to one skilled in the art.

Example 2

Separation of Particulate Species

A suspension comprising different species or different concentrations of species is injected within the cavity of the acoustic resonator of the present invention. Species could differ on size or even on acoustic properties such as acoustic impedance. Within the present example, a suspension of two species of polystyrene particles of 7 μm diameter (A) and of 2 μm diameter (B) are injected within the cavity.

By selecting a suitable frequency, the different species are trapped and positioned at different distances from the walls of the cavity. Once different equilibrium positions have been reached, a flow is established in such a way that only one kind species remains trapped while the other(s) are eluted, and the sample collected is filtered of the trapped species.

As acoustic force depends on particles size, acoustic force is much stronger for bigger species, at least 40 times stronger for species of 7 μm diameter relative to species of 2 μm diameter. Therefore, two effects are used: a) the time required for species to reach the equilibrium position is much smaller for bigger species; and b) the force to keep trapped bigger species is much stronger.

Consequently, when a flow is established; the average position of different species is different generating a differential transport along the cavity.

Figure 1:
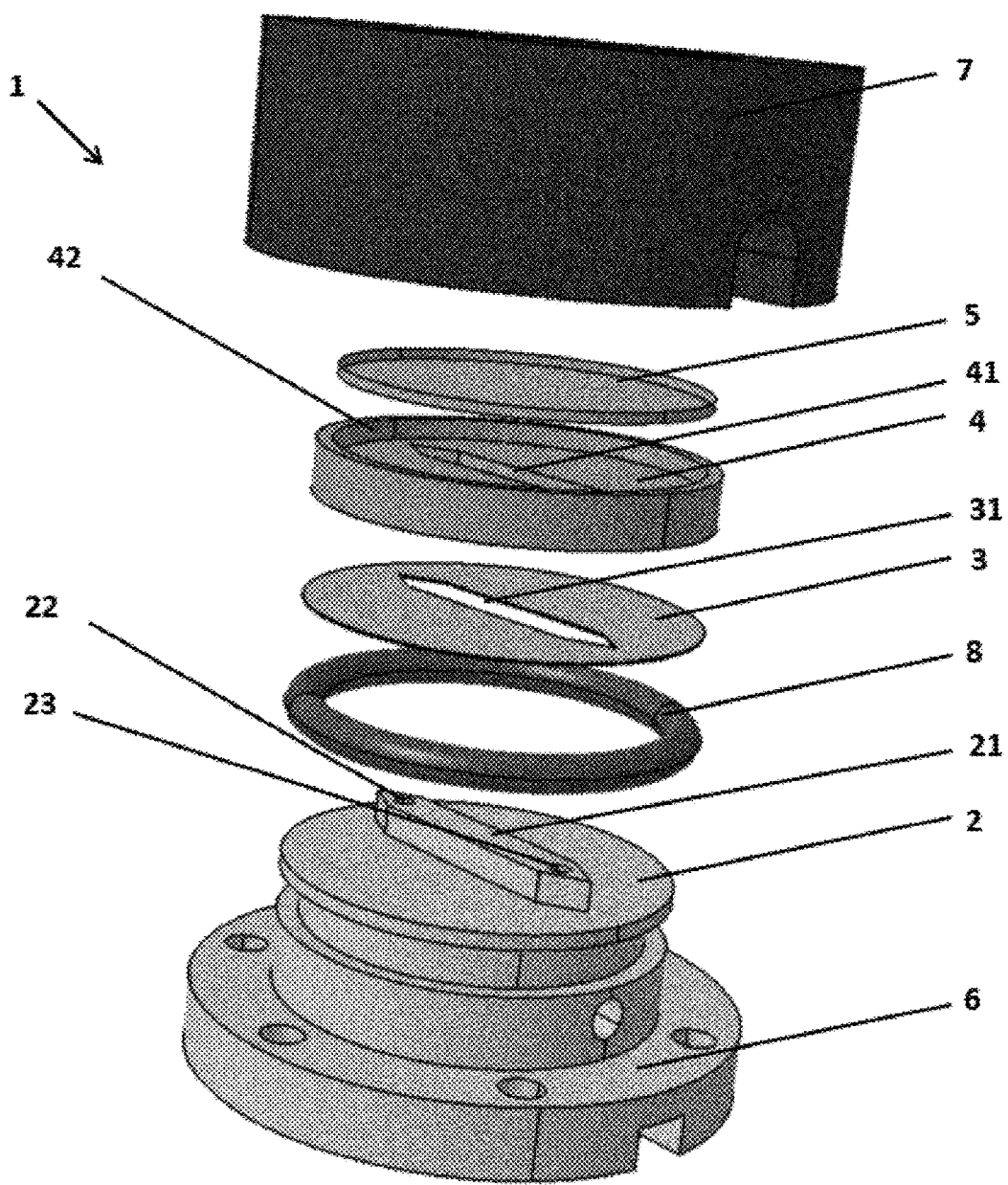
FIG. 1 is an exploded view of the device according to one embodiment of the present invention.
Figure 2:
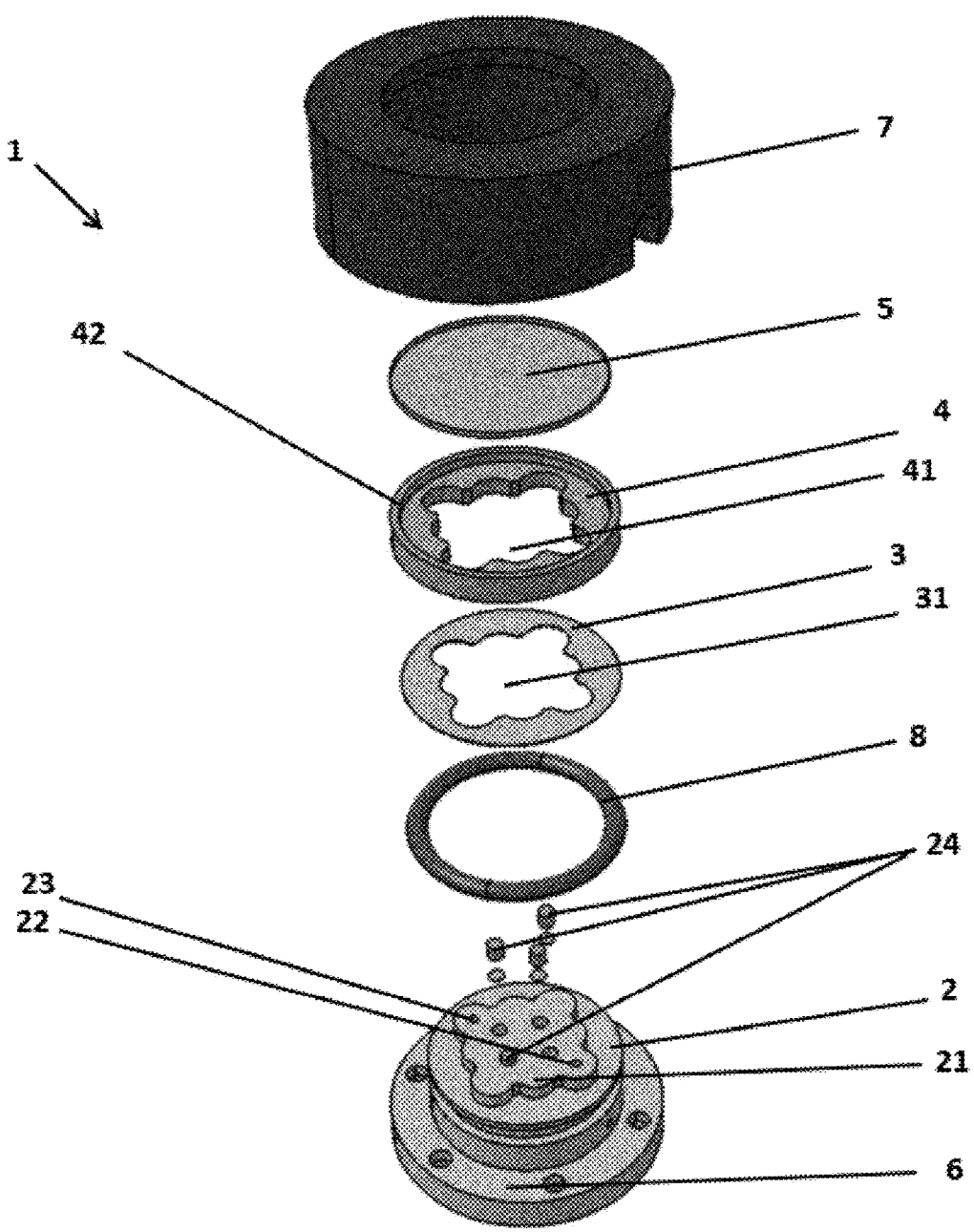
FIG. 2 is an exploded view of the device according to another embodiment of the present invention.
Figure 3:
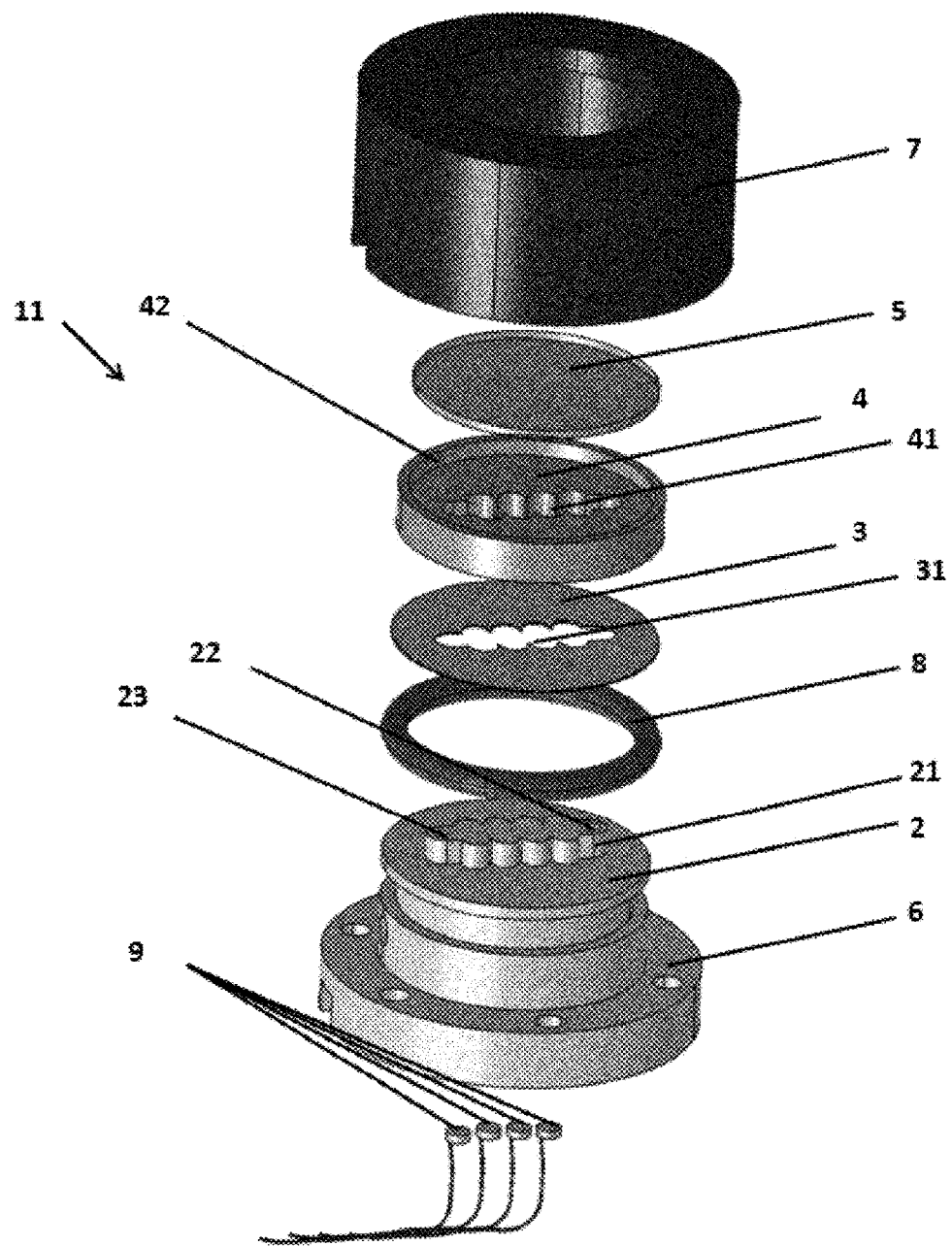
FIG. 3 is an exploded view of an acoustic resonator comprising a plurality of acoustic wave generators according to one embodiment of the present invention.
Figure 4:
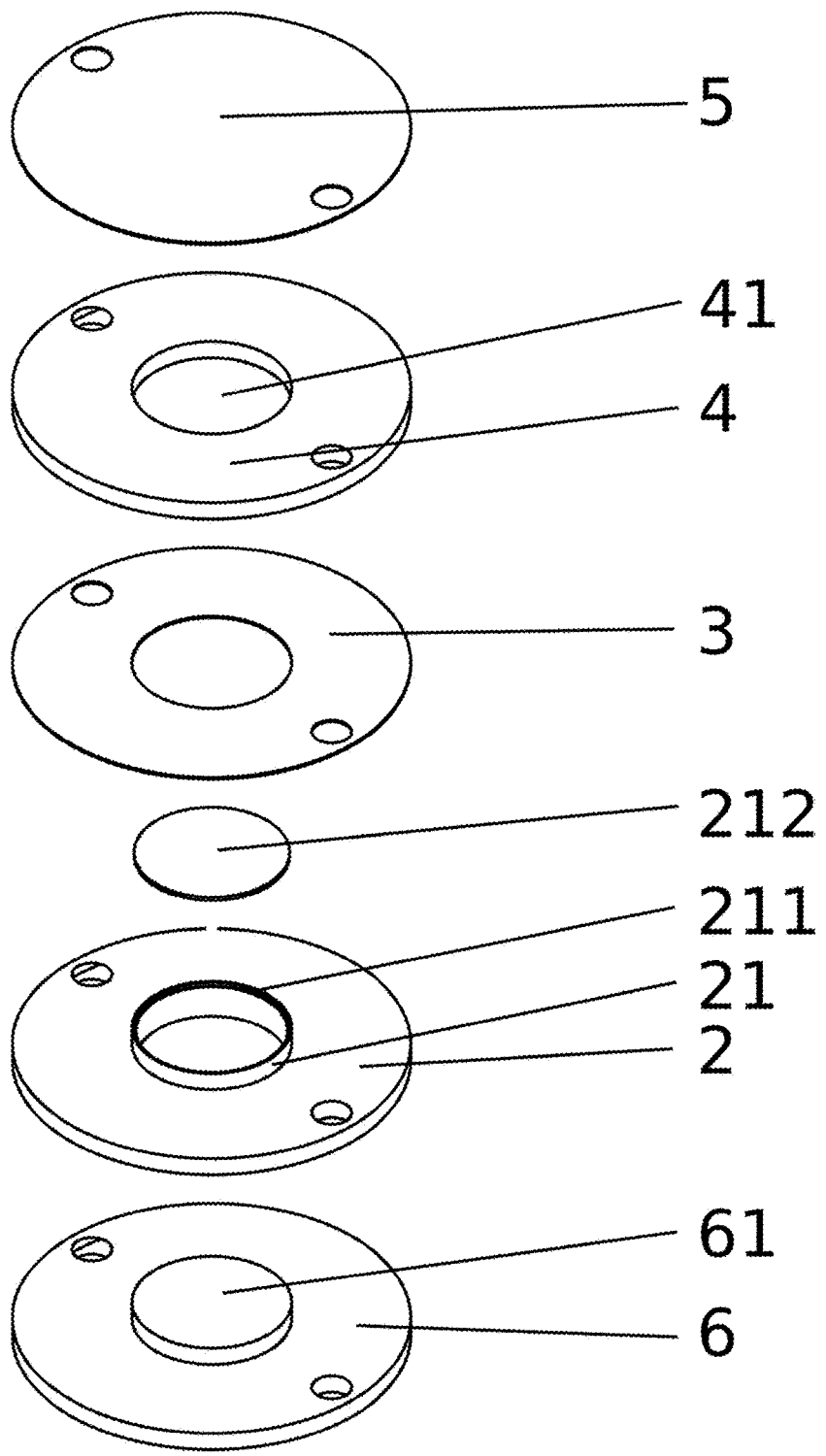
FIG. 4 is an exploded view of the device according to another embodiment of the present invention.
Figure 5A:
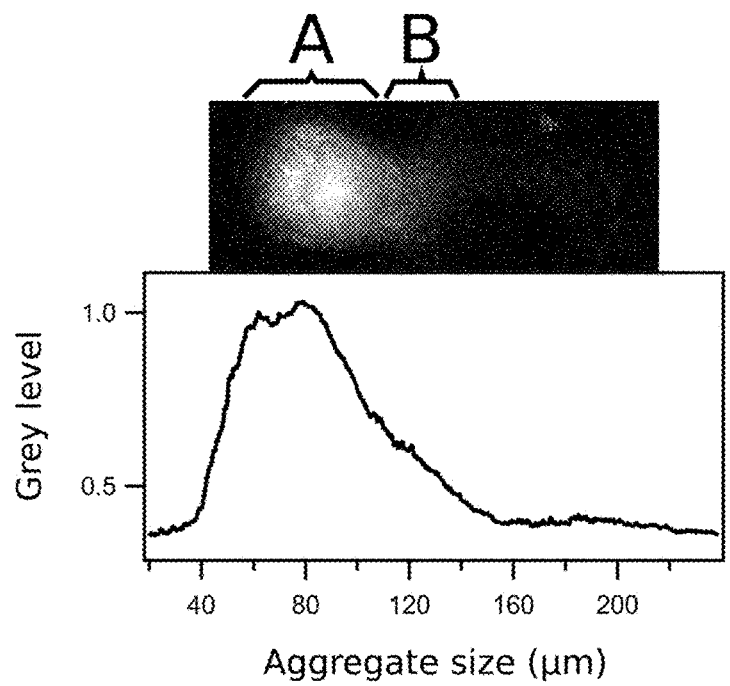
FIG. 5 illustrates the density profile of two species of particles during the separation of said particles by means of the acoustic resonator of the invention.
Figure 5B:
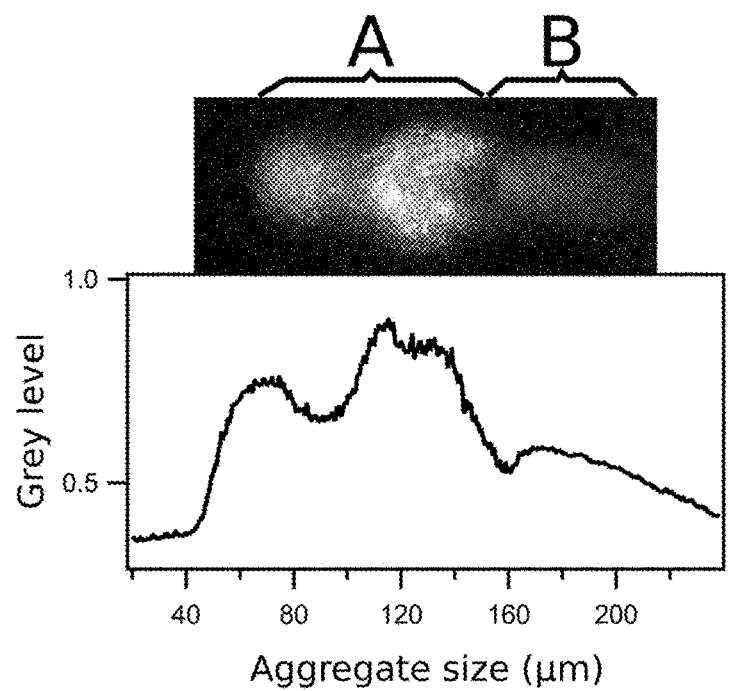
Figure 5C:
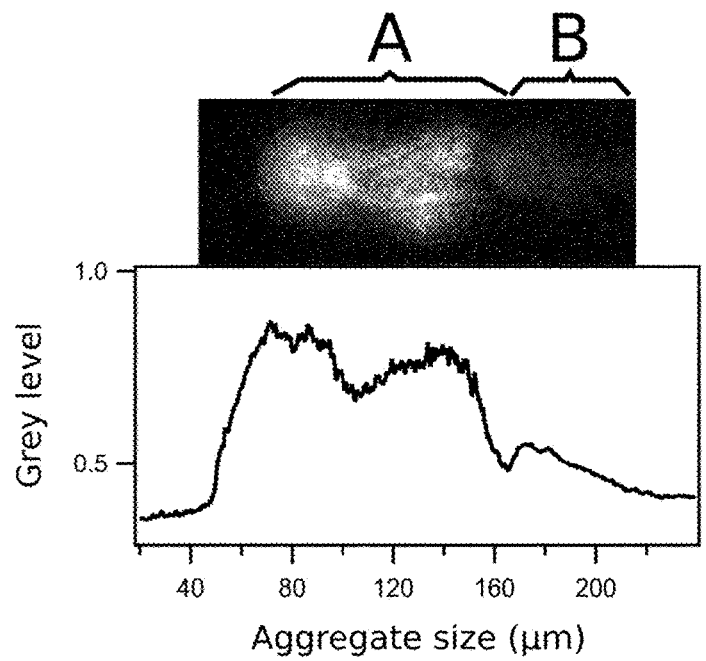
Figure 5D:
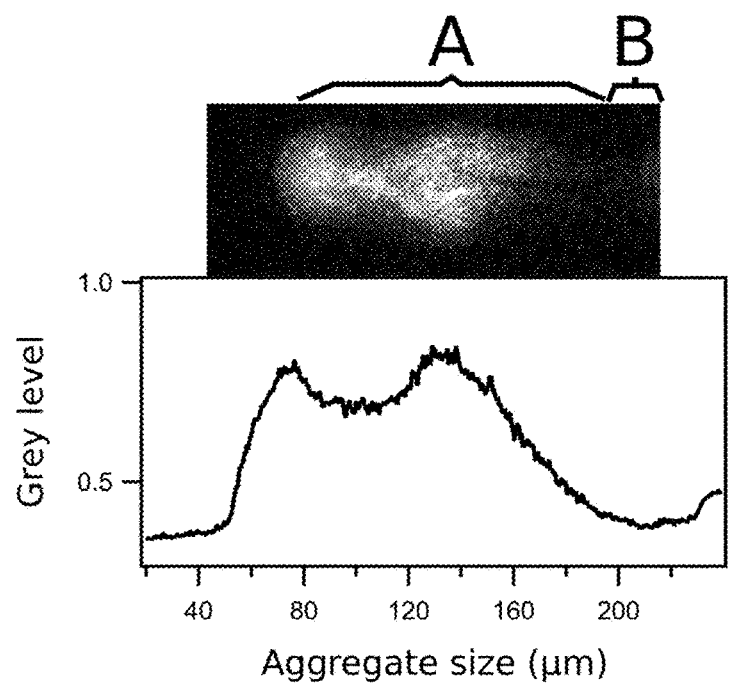
Figure 5E:
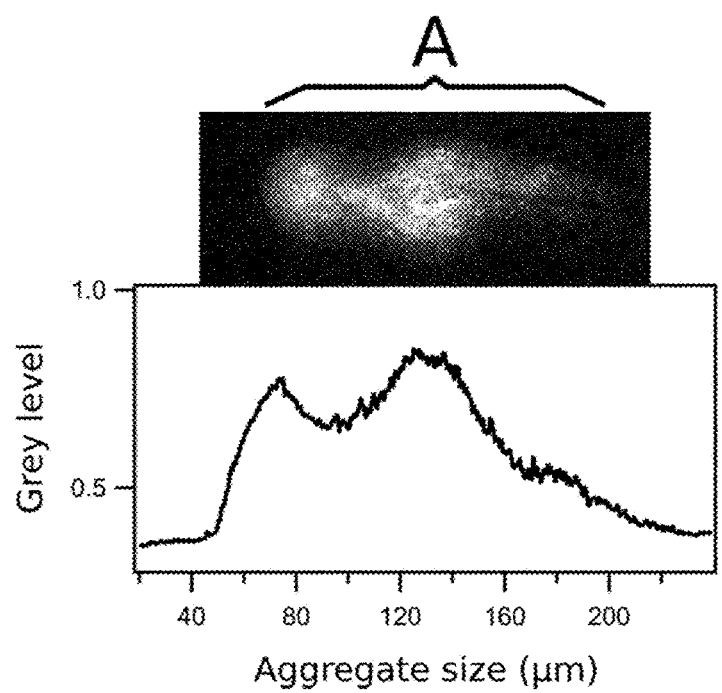

Within the present example, the smallest species can be eluted while the 7 μm particles remain trapped. FIG. 5 illustrate the density profile with peaks corresponding to the two species. Especially, FIGS. 5A, 5B, 5C, 5D and 5E show successively the different positions of both species, after respectively 0, 2, 3.4 and 5 seconds.

The invention claimed is:

1. A device (1), suitable for use as an acoustic resonator, comprising a base (2) adapted to be coupled to at least one acoustic wave generator, a spacer (3) comprising an aperture (31) and a reflector, wherein:
the base (2) comprises a protruding part (21) having a thickness t;
the aperture of the spacer (31) is complementary to the protruding part of the base (21);
the device (1) further comprises a housing (4) having an aperture (41) complementary to the protruding part of the base (21) and wherein the inner edge of the aperture (41) has the same thickness t as the protruding part (21); and
the housing (4) is positioned between the spacer (3) and the reflector (5), such that the thickness of the inner edge of the spacer (3) defines the thickness of a cavity between the protruding part (21) and the reflector (5).

2. The device according to claim 1, wherein the protruding part (21) is axisymmetric.

3. The device of claim 2, wherein the protruding part (21) is cylindrical, rhombohedral, parallelepiped or ribbon-shaped.

4. The device of claim 2, wherein the protruding part (21) is cylindrical or rhombohedral.

5. The device of claim 2, wherein the protruding part (21) is parallelepiped or ribbon-shaped.

6. The device according to claim 1, further comprising a supporting base (6) and a top part (7), wherein the base (2), the spacer (3), the housing (4) and the reflector (5) are held in position between the supporting base (6) and the top part (7).

7. The device according to claim 1, comprising a supporting base (6) and a top part (7), wherein the base (2), the spacer (3), the housing (4) and the reflector (5) are held in position between the supporting base (6) and the top part (7), wherein the supporting base (6) extends outwardly from the base (2); the top part (7) encompasses the base (2), the spacer (3), the housing (4) and the reflector (5); and the supporting base (6) and the top plate (7) are secured together.

8. The device according to claim 1, comprising a supporting base (6) and a top part (7), wherein the base (2), the spacer (3), the housing (4) and the reflector (5) are held in position between the supporting base (6) and the top part (7) and further comprising a gasket (8) ensuring tightness between the supporting base (6) and the top part (7).

9. The device according to claim 1, wherein the protruding part (21) comprises at least one inlet (22) and at least one outlet (23).

10. The device according to claim 1, wherein the base (2), the protruding part (21) or the housing (4) comprises a material selected from metal or plastic.

11. The device according to claim 1, wherein the reflector (5) comprises an optically transparent material selected from glass, quartz or plastic.

12. The device according to claim 1, wherein the protruding part (21) comprises an optically transparent material selected from glass, quartz or plastic.

13. The device according to claim 1, wherein the top part (7) comprises at the top an optically transparent window.

14. The device according to claim 1, wherein the spacer (3) comprises a material selected from polyimide or a polyethylene terephthalate.

15. An acoustic resonator (8) comprising the device according The device according to claim 1, and at least one acoustic wave generator (9) coupled to the base.

16. The acoustic resonator according to claim 15, wherein the at least one acoustic wave generator (9) is located below the protruding part of the base (21).

17. The acoustic resonator according to claim 15, wherein the at least one acoustic wave generator (9) is an ultrasonic wave generator.

18. The acoustic resonator according to claim 15, wherein the at least one acoustic wave generator (9) is a piezo transducer.

19. The acoustic resonator according to claim 15, wherein the at least one acoustic wave generator (9) is ring-shaped.

20. A method of trapping particles in a fluid comprising the steps of:

i. providing an acoustic resonator (11) comprising;
   at least on acoustic wave generator (9) for generating a sound wave of frequency f;
   a base (2) adapted to be coupled to the at least one acoustic wave generator (9);
   a spacer (3) comprising an aperture (31);
   an housing (4) comprising an aperture (41); and
   a reflector (5); wherein
the base (2) comprises a protruding part (21) having a thickness t;
the aperture of the spacer (31) is complementary to the protruding part of the base (21);
the aperture of the housing (41) is complementary to the protruding part of the base (21);
the inner edge of the aperture of the housing (41) has the same thickness t as the protruding part (21); and
the housing (4) is positioned between the spacer (3) and the reflector (5), such that the thickness of the spacer (3) defines the thickness of a cavity between the protruding part (21) and the reflector (5);
ii. introducing a fluid comprising particles into the cavity;
iii. selecting the frequency f such that the path length of the standing wave in the cavity is a multiple of ½ of the wavelength of the sound wave therein; and
iv. trapping the particles.

* * * * *